Sept. 3, 1957          E. WOLF          2,804,983
LIFT FOR TIRE-WHEEL UNITS
Filed Aug. 20, 1956
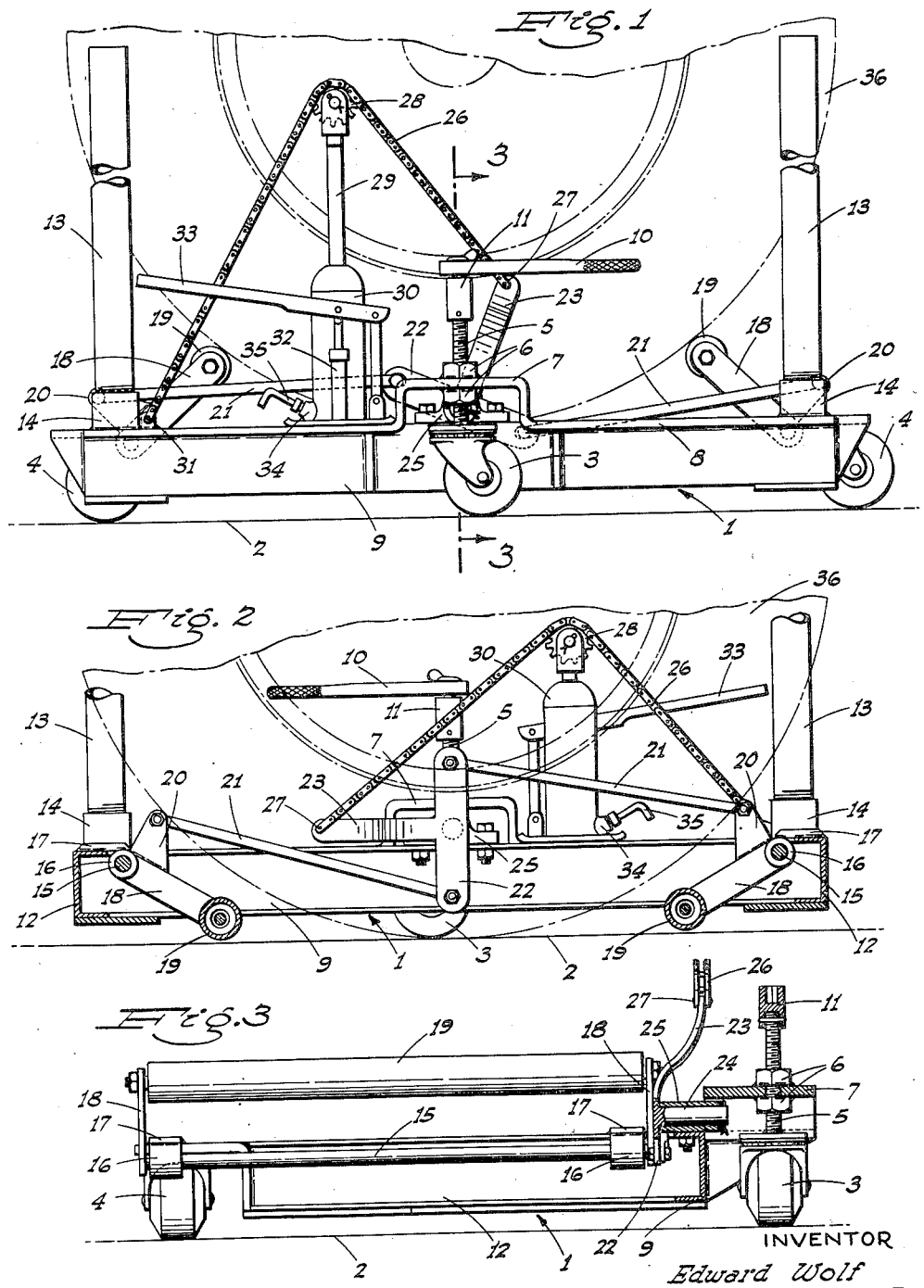
INVENTOR
*Edward Wolf*
BY *Webster & Webster*
ATTYS.

United States Patent Office 2,804,983
Patented Sept. 3, 1957

2,804,983

LIFT FOR TIRE-WHEEL UNITS

Edward Wolf, Stockton, Calif.

Application August 20, 1956, Serial No. 604,944

4 Claims. (Cl. 214—332)

The present invention relates to, and it is a major object to provide, a novel lift adapted for use in connection with the removal and replacement of wheel-mounted tires of a vehicle; the device being especially designed—but not limited—for use for truck or tractor tires which, when wheel-mounted, are heavy, cumbersome, and difficult to handle.

Another object of the invention is to provide a lift, as in the preceding paragraph, which is included in combination with a floor-supported dolly which not only permits a wheel-mounted tire on the device to be readily transported from point to point, but makes possible easy jockeying of the wheel to correct position for engagement on the hub.

Still another object of the invention is to provide a lift, of the type described, which includes a novel feature of adjustment by means of which the wheel-mounted tire on the device—when raised to a position coaxial with the hub—can also be adjusted so as to face such hub in parallelism, and which further simplifies the operation of engaging the wheel thereon.

An additional object of the invention is to provide a lift which—when in use to remove or replace a wheel-mounted tire—is operative in a manner to save time, eliminate the hard work and manual strain otherwise required, and affords a safe device for the purpose.

It is also an object of the invention to provide a lift, for wheel-mounted tires, which is designed for ease and economy of manufacture, and convenience of use.

An additional object of the invention is to provide a practical, reliable, and durable lift for tire-wheel units, and one which will be exceedingly effective for the purpose for which it is designed.

These objects are accomplished by means of such structure and relative arrangement of parts as will fully appear by a perusal of the following specification and claims.

In the drawings:

Fig. 1 is a rear end elevation of the lift, looking forward and showing the tire supporting rollers in raised position.

Fig. 2 is a transverse sectional elevation of the lift taken intermediate the ends thereof, looking rearward and showing the tire supporting rollers in lowered position.

Fig. 3 is a fragmentary longitudinal sectional elevation taken on line 3—3 of Fig. 1, and showing the tire supporting rollers in raised position as in Fig. 1.

Referring now more particularly to the drawings, and to the characters of reference marked thereon, the device comprises a rigid U-shaped frame, indicated generally at 1, which frame is disposed horizontally adjacent but clear of the floor 2, being supported at the rear by a central caster wheel 3 and at the front by transversely spaced caster wheels 4.

The rear caster wheel 3 includes a vertically adjustable threaded spindle 5 which extends upwardly through nuts 6 fixed to a vertically offset portion 7 formed in the top flange 8 of the rear cross beam 9 of said frame 1. The threaded spindle 5 is adapted to be rotated, to effect upward or downward adjustment, by means of a ratchet wrench 10 which is engaged with said spindle by means including a socket 11 on the upper end of the latter.

The front caster wheels 4 are mounted in connection with the forward ends of longitudinally extending side beams 12 included in said frame 1. As supported by the caster wheels 3 and 4 the frame 1 is movable in the manner of a dolly on the floor 2. Such movement is accomplished and controlled manually through the medium of hand posts 13 which upstand from the rear corners of said frame; such hand posts being removably secured in sockets 14.

A longitudinal shaft 15 extends substantially from end to end of each side beam 12 laterally inwardly thereof, and each such shaft is carried adjacent the ends in bearings 16 rigidly attached to the related side beam 12 by brackets 17.

At the ends thereof—i. e. beyond the bearings 16—each longituidnal shaft 15 is fitted with radial lever arms 18; the arms corresponding to each such shaft being disposed in parallelism, and a longitudinal roller 19 is journaled in connection with—and spans between—the outer or free ends of said corresponding lever arms.

The lever arms 18, on each shaft 15, are adapted to swing between a downwardly and inwardly inclined position (see Fig. 2) and an upwardly and inwardly inclined position (see Figs. 1 and 3), whereby to dispose the rollers 19 at a relatively low point within the frame 1, or at an elevated point above said frame, respectively.

The rollers 19 are the elements which engage the wheel-mounted tire with which the lever is used, and which manner of use will hereinafter appear.

At their inner ends each of the radial lever arms 18 which lie adjacent the rear cross beam 9 are fitted with an upstanding ear 20, whereby each such lever arm 18 and the corresponding ear 20 form—in effect—a bellcrank lever.

Links 21 are pivoted at their outer ends in connection with the upper ends of the ears 20 and thence extend inwardly, one such link at a downward incline and the other at an upward incline; such links at their inner ends being pivoted to the corresponding ends of a double-ended bellcrank lever 22 disposed vertically adjacent the rear cross beam 9, and with the intermediate leg 23 projecting laterally.

Such laterally projecting intermediate leg 23 is substantially horizontal when the rollers 19 are in their lowered position. The double-ended bellcrank lever 22 is formed, at the center point, with a rearwardly projecting stub shaft 24 carried in a journal 25 fixed to said rear cross beam 9 centrally of the ends of the latter.

A chain 26 is connected at one end, as at 27, to the outer end of the laterally projecting leg 23 of the double-ended bellcrank lever 22, and such chain thence extends, in a transverse plane, at an upward incline to—and turns in meshing engagement over—a sprocket 28 on the upper end of the perpendicular piston rod 29 of a hydraulic jack mounted on the rear cross beam 9 in an upstanding position.

From the sprocket 28 the chain 26 then extends at a downward incline to an anchor point 31 on the rear cross beam 9 adjacent one of the sockets 14.

The hydraulic jack 30, which in its working parts is substantially conventional, includes a pump 32—worked by a reciprocable lever 33—to actuate the jack and raise the piston rod 29, and a release valve 34—having a hand stem 35—which when opened permits the piston rod 29 to lower.

The lever 33 is disposed above—and extends generally lengthwise of—the rear cross beam 9 so that it occupies an out-of-the-way but convenient position for use.

When in use to aid in the removal of a wheel-mounted tire 36 from a hub on a vehicle, the vehicle is first raised by a suitable jack until the tire clears the floor 2. The device is then manipulated by the hand posts 13 until the rollers 19 occupy a position directly beneath the tire 36 and lying substantially equi-distant on opposite sides of the bottom dead-center point of said tire.

Thereafter, the hydraulic jack 30 is operated to cause the piston rod 29 to rise, which results in the chain 26 being pushed upwardly intermediate its ends by the sprocket 28, and which reduces the effective length of such chain, pulling upwardly on the outer end of the intermediate leg 23 of the double-ended bellcrank lever 22; the latter swinging in a direction to thrust outwardly on both of the links 21, which results in the rollers 19 being swung from their lowered position to a raised position in engagement with said tire 36.

Next, the wheel-securing bolts are loosened and removed so that the wheel-mounted tire 36 may then be drawn off the hub by shifting the device rearwardly on the floor. The wheel-mounted tire 36 as thus removed from the hub remains supported on the raised rollers 19 for transport to any desired point, being then lowered to the floor 2—so that the tire rests at its bottom dead-center point thereon—by the simple expedient of releasing the hydraulic jack and return of the piston rod 29 to its lowered position.

To replace the wheel-mounted tire 36 on the hub of the vehicle, the above described steps are merely repeated, but in reverse order. Also, the rollers permit the supported, wheel-mounted tire to be rotated to position the openings in the wheel with the lugs on the hub.

In order to assure that the wheel-mounted tire 36 lies true to the hub of the vehicle—i. e. in parallel facing relation when the removing or replacing operation is being accomplished—the threaded spindle 5 may be adjusted upwardly or downwardly by working the ratchet wrench 10; the result being that the frame 1 and the rollers 19 are brought to proper position for accomplishment of such result.

With the described dolly-type lift, large and heavy-duty wheel-mounted tires—either single or dual—and which are cumbersome and difficult to otherwise handle, may be readily, easily, and conveniently removed from, or replaced on, the hub of a vehicle.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A lift, for an upstanding tire, comprising a frame supported for movement along a floor, the frame including a rear cross beam and side beams projecting forwardly from the ends of the latter, elongated transversely spaced elements disposed adjacent corresponding side beams, said elements being adapted to engage opposite sides of the lower portion of and to support the tire, means mounting the tire engaging elements in connection with said corresponding side beams for movement laterally inwardly thereof between a lowered position and a raised position, and means between the frame and said elements operative to simultaneously move the latter between said positions; said last named means including transversely spaced levers disposed adjacent the rear cross beam and swingable about axes extending longitudinally of the side beams, a double-ended lever pivoted intermediate its ends on the rear cross beam between the transversely spaced levers and likewise swingable about a longitudinal axis, links connected between the ends of the double-ended lever and the related transversely spaced levers, and mechanism on the frame attached to and operative to reversibly swing said double-ended lever and to then releasably hold the same in selected positions.

2. A lift, as in claim 1, in which said mechanism includes a transverse chain connected at one end in actuating relation to the double-ended lever and at the other end to the frame, a jack mounted on the rear cross beam, the jack having an upwardly projecting piston rod, and a sprocket on the piston rod, the chain being trained intermediate its ends over the sprocket.

3. A lift, for an upstanding tire, comprising a frame supported for movement along a floor, the frame including a rear cross beam and side beams projecting forwardly from the ends of the latter, a longitudinal shaft journaled on each side beam, radial arms on and extending inwardly from each shaft, a roller spanning between and secured to the radial arms on each shaft, the rearmost radial arms on the shafts being adjacent the rear cross beam, ears upstanding from said rearmost radial arms, a double-ended bellcrank lever pivoted on the rear cross beam intermediate its ends for rotation about a longitudinal axis, said bellcrank lever including an upwardly projecting leg, a downwardly projecting leg, and a lateral leg; links connected to the upper and lower ends of said upwardly projecting leg and downwardly projecting leg respectively, said links extending in opposite directions and being connected to the related ears, and mechanism on the rear cross beam connected to the lateral leg of the bellcrank lever to reversibly rotate such lever whereby to cause the radial arms to swing between an inwardly and downwardly inclined position with the rollers lowered and an inwardly and upwardly inclined position with the rollers raised; said mechanism releasably holding the rollers in either of such positions.

4. A lift, for an upstanding tire, comprising a frame supported for movement along a floor, the frame including a rear cross beam and side beams projecting forwardly from the ends of the later, a longitudinal shaft journaled on each side beam, radial arms on and extending inwardly from each shaft, a roller spanning between and secured to the radial arms on each shaft, the rearmost radial arms on the shafts being adjacent the rear cross beam, ears upstanding from said rearmost radial arms, a double-ended bellcrank lever pivoted on the rear cross beam intermediate its ends for rotation about a longitudinal axis, said bellcrank lever including an upwardly projecting leg, a downwardly projecting leg, and a lateral leg; links connected to the upper and lower ends of said upwardly projecting leg and downwardly projecting leg respectively, said links extending in opposite directions and being connected to the related ears, a hydraulic jack mounted on and upstanding from the rear cross beam in transversely spaced relation to the bellcrank lever, said jack including an upwardly projecting piston rod, a sprocket on the upper end of the piston rod, a transversely extending chain trained intermediate its ends over the sprocket, the reaches of the chain inclining downwardly in opposite directions from the sprocket, and means connecting the corresponding end of the chain to the lateral leg of the bellcrank lever, the other end of the chain being anchored to the frame.

References Cited in the file of this patent

UNITED STATES PATENTS

| | | |
|---|---|---|
| 2,170,607 | Green | Aug. 22, 1939 |
| 2,476,493 | Johnson | July 19, 1949 |
| 2,725,998 | Huff | Dec. 6, 1955 |